J. P. FULGHUM & L. L. LAWRENCE.
Corn-Planters.
No. 140,493.                                Patented July 1, 1873.
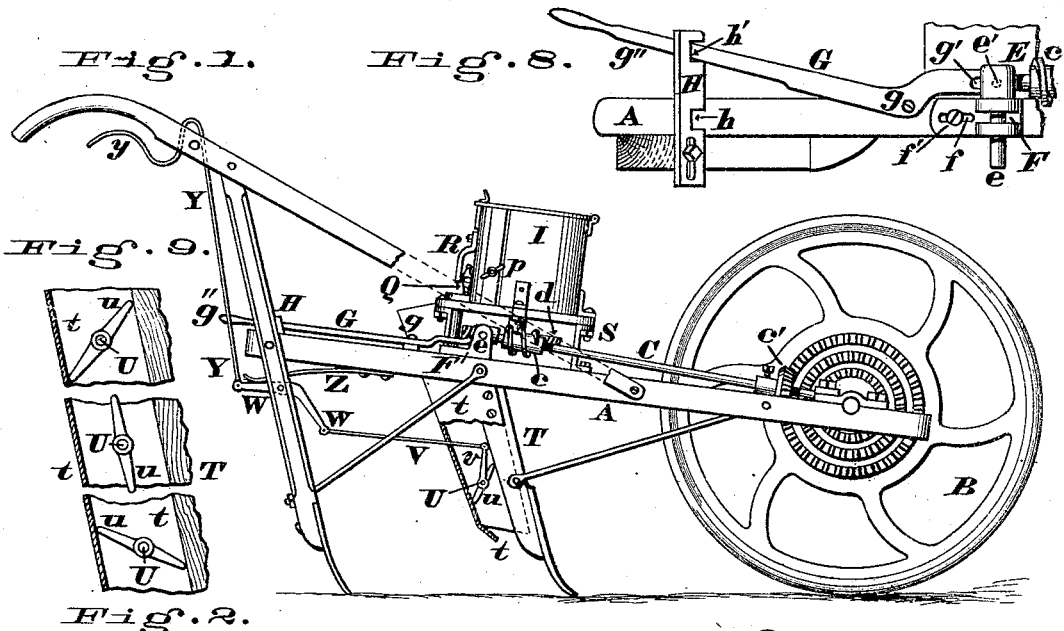
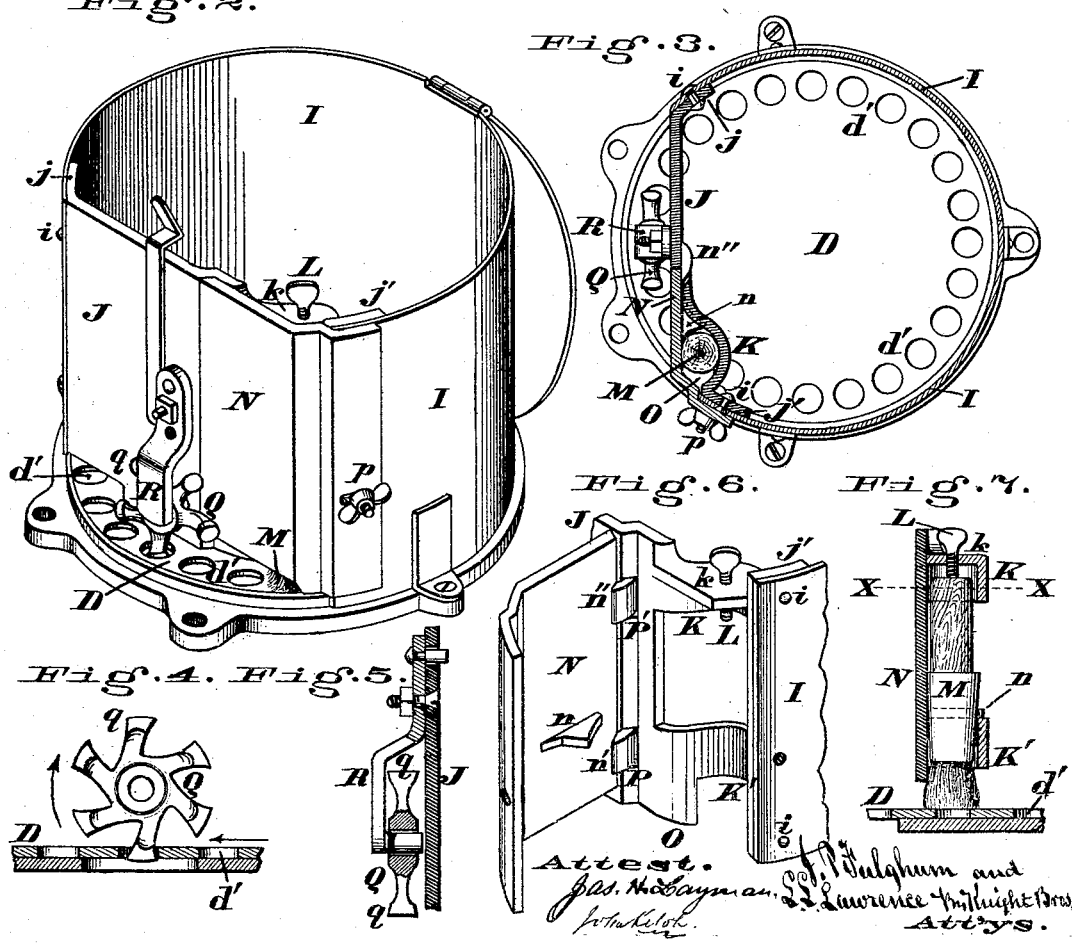

UNITED STATES PATENT OFFICE.

JESSE P. FULGHUM AND L. LOVELL LAWRENCE, OF DUBLIN, INDIANA, ASSIGNORS TO WAYNE AGRICULTURAL COMPANY, OF SAME PLACE.

IMPROVEMENT IN CORN-PLANTERS.

Specification forming part of Letters Patent No. 140,493, dated July 1, 1873; application filed May 20, 1873.

*To all whom it may concern:*

Be it known that we, JESSE P. FULGHUM and L. LOVELL LAWRENCE, both of Dublin, Wayne county, Indiana, have invented a new and useful Corn-Planter, of which the following is a specification:

Our invention relates to improvements in those corn-planters whose seed-delivering slide consists of a revolving perforated disk, and in which the delivery of the seed is made positive and uniform by means of suitable geared connections with the ground-wheel under the control of the operator; and our invention comprises devices for cutting off more or less of the seed, and for compelling the descent of that portion of the seed which has escaped or passed beneath the cut-off mechanism, and to mechanism to facilitate the introduction of the brush.

Figure 1 is a side elevation of a corn-planter embodying our invention, a portion of the grain-spout being shown in section. Fig. 2 is a perspective view of the hopper. Fig. 3 is a horizontal section of the hopper. Figs. 4 and 5 are, respectively, a front elevation and an axial section of our combined cut-off and forwarding wheel or spider. Fig. 6 is a perspective view of a portion of the hopper, showing the brush-case in its open condition. Fig. 7 is a vertical section of the brush-case and a portion of the revolving disk, the brush being seen in elevation. Fig. 8 is a top view of lever and rack for coupling and uncoupling the worm-gear. Fig. 9 represents, by three diagrams, the various positions of our butterfly-valve.

The frame A, ground-wheel B, worm-shaft C, and hopper-stand S may be of usual construction, as shown. The worm-shaft has the usual capacity for horizontal vibration, so as to throw its worm $c$ either in or out of gear with the worm-wheel $d$, which is permanently secured to the under side of the revolving disk D, as usual. In order, however, to enable this worm to be thrown either in or out of gear with its wheel we provide its rear journal-box E with a stud or wrist, $e$, which, occupying a socket, F, attached to the frame, permits the lateral shifting of the shaft without ungearing the pinion $c'$. The slot $f$ in socket F permits it to be adjusted to any desired position, and the bolt $f'$ then serves to hold it securely to such position. The rear or shiftable end of the worm-shaft is capable of being thrown in and out of gear by means of lever G, pivoted at $g$ to the frame, and having a slot, $g'$, which receives a stud, $e'$, from the box E, said lever terminates rearward in a handle, $g''$, convenient to the operator. Said handle has a slight upward spring, so as to enter and be retained in one or other notch, $h$ or $h'$, of a rack, H.

In order to provide a light hopper, and at the same time one which is stiff enough to retain its proper shape and allow the ready attachment and detachment of the cut-off brush, we construct the aforesaid member of the implement in the following manner: I represents a plate of sheet-iron or other metal, which is bent so as to assume the represented segmental shape, and this sheet-metal portion of the hopper has secured to its ends, by the rivets $i$, wings $j\,j'$ of a flat cast plate, J. By this arrangement the plate J becomes the chord of a circle, of which the sheet-metal portion I is the arc, as clearly shown in Fig. 3. The plate J is connected to the wing $j'$ by two curved ribs, K K', of which the upper one, K, is provided with a horizontal flange, $k$, having a set-screw, L, tapped into it, that bears upon the top of the cut-off brush M, by means of which said brush may be held down with any desired force upon the disk.

By these means we are enabled, at any time, to present a new and unworn side of the brush to the work, or to adjust the brush to cut off a greater or less quantity of grain, or to take out one brush and insert another without emptying the box of grain.

This brush occupies a recess, O, formed between the wing $j'$, ribs K K', and flange $n$, upon the inner surface of the door or flap N. In order that the brush M may be readily fitted within this recess, and maintained in its proper position therein, the door N is rendered capable of being opened when desired, and of being securely closed, by the following arrangement of devices: Projecting from the door N are two curved lugs, $n'\ n''$, which engage in apertures P P' of the plate J, by which means the door is rendered capable of being opened and closed at will, and of being disengaged from said plate without the necessity of a removable or other pintle, or any other device that would be liable to be lost or mislaid. A thumb-screw, $p$, secures the face-edge of the door and prevents accidental opening of the same. In order to insure the descent of all grains that have passed under the cut-off brush, and entered either of the orifices $d'$, we provide a spider, Q, pivoted to a hanger, R, in rear of the hopper J, and whose prongs are of such consecutive distance as to cause them to enter the successive orifices, from which their expanded terminations $q$ act both to force the contained grains downward, and to prevent the entrance of any additional grains that may work their way outside of the box. Attached to the stock T is a grain spout or conductor, $t$, athwart which, and near the lower or delivery end of the same, is journaled a rock-shaft, U, that carries a butterfly-valve, $u$. This valve is of such dimensions as to completely close the conductor whenever said valve is in its normal position, as shown in Fig. 1. Secured to one end of the rock-shaft is an arm, $v$, which is coupled to a bell-crank, W, by the connecting-rod V. Adapted to bear upon the horizontal portion of the aforesaid bell-crank is a spring, Z, which is secured to the under side of beam A. The free end of the horizontal member of the bell-crank has pivoted to it a rod, Y, whose upper end is curved at $y$, so as to constitute a handle. The curved portion $y$ of the aforesaid rod is preferably located near the right handle of the implement, so as to be readily operated by the person in charge of the planter.

From the above description it will be readily seen that the stress of spring Z tends to maintain the valve in one of its closed positions, as shown in Fig. 1, and also in the upper diagram of Fig. 9. This positive closure of said valve effectually prevents the discharge of grain while the implement is passing from one hill to another, and consequently prevents waste and irregular dropping.

Upon arriving at a hill the operator has simply to press the handle $y$, so as to cause the bell-crank W to turn on its pivot, thereby opening the valve and allowing the grain, which had accumulated, to descend and be deposited at the exact place where it is needed. This discharging position of the valve is clearly shown in the intermediate diagram of Fig. 9.

By elevating the handle $y$ to its utmost limit the valve $u$ is brought to a position the reverse of that shown in Fig. 1, and again closed, as seen in the lower diagram of Fig. 9.

This double-acting closure of the butterfly-valve is a great advantage peculiar to our planter, as said valve has two effective movements imparted to it by a single elevation and liberation of the operating-handle $y$.

We claim as new and of our invention—

1. In the described combination with horizontally-revolving seed-disk D $d$ $d'$, the vertically-revolving spider Q, formed and operating as set forth.

2. The combination of the plate J $j$ $j'$, curved ribs K K', and swinging door or flap N, together with the lugs $n'$ $n''$ and apertures P P', whereby said door is rendered capable of being detached from the hopper for the insertion of a brush, M, as herein explained.

In testimony of which invention we hereunto set our hands.

JESSE P. FULGHUM.
L. LOVELL LAWRENCE.

Attest:
GEO. H. KNIGHT,
H. SCHOONMAKER.